US010430938B2

United States Patent
Batikoff et al.

(10) Patent No.: US 10,430,938 B2
(45) Date of Patent: Oct. 1, 2019

(54) METHOD OF DETECTING DEFECTS IN AN OBJECT

(71) Applicant: APPLIED MATERIALS ISRAEL LTD., Rehovot (IL)

(72) Inventors: Amit Batikoff, Petach Tikva (IL); Doron Portnoy, Kfar-Yona (IL)

(73) Assignee: Applied Materials Israel Ltd., Rehovot (IL)

( * ) Notice: Subject to any disclaimer, the term of this patent is extended or adjusted under 35 U.S.C. 154(b) by 122 days.

(21) Appl. No.: 15/655,796

(22) Filed: Jul. 20, 2017

(65) Prior Publication Data
US 2019/0026879 A1    Jan. 24, 2019

(51) Int. Cl.
G06K 9/00    (2006.01)
G06T 7/00    (2017.01)
G06T 5/50    (2006.01)
G06T 5/00    (2006.01)
G06K 9/62    (2006.01)

(52) U.S. Cl.
CPC ............ *G06T 7/001* (2013.01); *G06K 9/6202* (2013.01); *G06K 9/6215* (2013.01); *G06T 5/006* (2013.01); *G06T 5/50* (2013.01); *G06T 2207/10024* (2013.01); *G06T 2207/30148* (2013.01)

(58) Field of Classification Search
None
See application file for complete search history.

(56) References Cited

U.S. PATENT DOCUMENTS

| 10,186,028 B2 * | 1/2019 | Brauer | G06T 7/001 |
| 2008/0292194 A1 * | 11/2008 | Schmidt | G06T 7/0012 382/217 |
| 2011/0043604 A1 * | 2/2011 | Peleg | G06T 3/4038 348/36 |
| 2014/0071125 A1 * | 3/2014 | Burlina | G06T 17/00 345/420 |
| 2015/0310622 A1 * | 10/2015 | Kholodenko | G01S 17/89 382/154 |
| 2016/0148359 A1 * | 5/2016 | Gnedin | G06T 5/20 382/264 |
| 2017/0169552 A1 * | 6/2017 | Brauer | G06T 7/001 |

* cited by examiner

Primary Examiner — Hadi Akhavannik
(74) Attorney, Agent, or Firm — Lowenstein Sandler LLP

(57) ABSTRACT

A method, system, and computer program product of detecting defects in an object using a processor operatively connected to a memory, the method comprising: accommodating in the memory an image group comprising a reference image and an image; generating a set of correction parameters to be applied to pixels of an image from the image group, wherein the parameters are determined to minimize a combination of a first factor indicative of variability of the set, and a second factor indicative of a difference between an image from the image group as enhanced by applying the set and another image in the image group, wherein the combination increases as any factor increases; applying the set to the image of the image group to obtain an enhanced image; generating an optimal difference image between the enhanced image and the other image; and using the optimal difference image for detecting defect candidates.

22 Claims, 5 Drawing Sheets

METHOD OF DETECTING DEFECTS IN AN OBJECT

TECHNICAL FIELD

The presently disclosed subject matter relates to examining objects such as wafers, and more particularly to detecting defects in objects by examining captured images of the objects.

BACKGROUND

The term "object" used in this specification should be expansively construed to cover any kind or specimen of wafers, masks, reticles and other structures, combinations and/or parts thereof used for manufacturing semiconductor integrated circuits, magnetic heads, flat panel displays, and other semiconductor-fabricated articles. Various objects such as semiconductor wafers, printed circuit boards, solar panels and micro-electromechanical devices are fabricated by manufacturing processes that are highly complex and costly, comprise multiple stages, and require highly accurate machines.

The term "defect" used in this specification should be expansively construed to cover any kind of abnormality or undesirable feature formed on or within a wafer.

The complex manufacturing process of objects is not error-free and such errors may cause faults in the manufactured objects. The faults may include defects that can harm operation of the object, and nuisances, which may be defects, but do not cause any harm or malfunction of the manufactured unit. Errors may be caused during the manufacturing process, due to faults in the raw material, mechanical, electrical or optical errors, human errors or others, which may cause defects in the wafers. Further defects may be caused by spatio-temporal factors, such as temperature changes of the wafer occurring after one or more captures during the examination process, which may cause slight deformations of the wafer.

Unless specifically stated otherwise, the term "examination" used in this specification should be expansively construed to cover any kind of detection and/or classification of defects in an object. Examination is provided by using non-destructive inspection tools during or after manufacture of the object to be examined. By way of non-limiting example, the examination process can include runtime scanning (in a single or in multiple scans), sampling, reviewing, measuring, classifying and/or other operations provided with regard to the object or parts thereof using the same or different inspection tools Likewise, examination can be provided prior to manufacture of the object to be examined and can include, for example, generating an examination recipe(s). It is noted that, unless specifically stated otherwise, the term "examination" or its derivatives used in this specification are not limited with respect to resolution or size of inspection area. A variety of non-destructive inspection tools includes, by way of non-limiting example, scanning electron microscopes, atomic force microscopes, optical inspection tools, etc.

The examination process can also introduce further alleged errors, for example due to optical, mechanical or electrical problems in the examination equipment or process which thus provide imperfect captures. Such errors may produce false positive findings, which may seem to contain a defect, but there is no actual defect at the area.

Unless specifically stated otherwise, the term "image" used in the specification should be expansively construed to cover any non-destructive capturing of an object, including, but not limited to, capturing by an optical device, capturing by a scanning electron microscope, or by any other device. The term may also relate to a processed captured image, to a combination of two or more captured images, to a synthetically generated visual representation of an object or part thereof manufactured upon description, such as design data of the object, or the like.

Some techniques for examining objects for defects include comparing a captured image of an object to a reference image, wherein differences between the images may suggest a possible defect in the examined object at the location of a difference. However, such comparison may not always be straightforward due, inter alia, to differences between the images which are not related to possible defects. For example certain elements cannot be identified at either image at all or at an expected location, due for example to location mismatch, size mismatch, color or shade mismatch, or the like. The problems may be caused by defects which may be present in the object and need to be detected, problems occurring during capturing the object, such as but not limited to optical or mechanical problems, thus disabling or damaging registration, and other causes.

GENERAL DESCRIPTION

In accordance with a certain aspect of the presently disclosed subject matter, there is provided a method of detecting one or more defects in an object using a processor operatively connected to a memory, the method comprising: accommodating in the memory an image group comprising a reference image of the object and an image of the object; generating at least a first set of correction parameters to be applied to a plurality of pixels of an image from the image group, wherein the first set of correction parameters are determined so as to minimize a value of a combination of: a first factor indicative of variability of the first set of correction parameters, and a second factor indicative of a difference between an image from the image group as enhanced by applying the first set of correction parameters and another image in the image group, wherein the value increases as the first factor or the second factor increases; applying the first set of correction parameters to the image of the image group to obtain a first enhanced image; generating a difference image between the first enhanced image and the another image from the image group; and using the difference image for detecting defect candidates. The method can further comprise: generating a second set of correction parameters to be applied to a plurality of pixels of the another image from the image group, wherein the correction parameters in the second set are determined so as to minimize a value of a combination of: a third factor indicating variability of a third set of correction parameters consisting of a sum of the first set of the correction parameters and the second set of correction parameters, and a fourth factor indicative of a difference between the image from the image group as enhanced by the applying the first set of correction parameters and the another image in the image group as enhanced by the applying the second set of correction parameters, wherein the difference image is generated between the first enhanced image and the another image enhanced by the applying the second set of correction parameters. The correction parameters can comprise, for example, shift in two dimensions or gray level correction and gray level offset. Within the method, the first set of correction parameters are optionally determined using an optical flow method. Within the method, the first set of correction parameters are optionally determined using a Markov Random Fields method. Within the method, the first set of correction parameters are optionally determined by solving a system of linear equations, for example a system of 4*N*M linear equations, wherein N and M are sizes in pixels of edges of the reference image. Within the method, the image is optionally obtained by combining two or more images having different perspectives. Within the method, the reference image is optionally obtained by combining two or more reference images having different perspectives. The method can further comprise: generating a first Gaussian pyramid for the reference image; generating a second Gaussian pyramid for the image; and performing said accommodating the reference image, said accommodating the image and said determining, for each pair of corresponding layers of the first Gaussian pyramid and the second Gaussian pyramid. Within the method, any correction parameter of the first set of correction parameters is optionally a real number representing a sub-pixel shift or a sub gray-level correction or offset.

In accordance with other aspects of the presently disclosed subject matter, there is provided a method of detecting one or more defects in an object using a processor operatively connected to a memory, the method comprising: accommodating in the memory an image group comprising a reference image of the object and an image of the object; generating at least a first set of correction parameters to be applied to a plurality of pixels of a first image from the image group, and a second set of correction parameters to be applied to a plurality of pixels of a second image from the image group, wherein the first set of correction parameters and the second set of correction parameters are determined so as to minimize a value of a combination of: a first factor indicative of variability of a third set of correction parameters consisting of a sum of the first set of the correction parameters and the second set of correction parameters, and a second factor indicative of a difference between the first image as enhanced by applying the first set of correction parameters and the second image from the image group as enhanced by applying the second set of correction parameters, wherein the value increases as the first factor or the second factor increases; applying the first set of correction parameters to the first image of the image group to obtain a first enhanced image; applying the second set of correction parameters to the second image of the image group to obtain a second enhanced image; generating a difference image between the first enhanced image and the second enhanced image and using the difference image for detecting defect candidates.

In accordance with yet other aspects of the presently disclosed subject matter, there is provided a computerized system for examining a wafer, the system comprising a processor configured to: accommodate in the memory an image group comprising a reference image of the object and an image of the object; generate at least a first set of correction parameters to be applied to a plurality of pixels of an image from the image group, wherein the first set of correction parameters are determined so as to minimize a value of a combination of: a first factor indicative of variability of the first set of correction parameters, and a second factor indicative of a difference between an image from the image group as enhanced by applying the first set of correction parameters and another image in the image group, wherein the value increases as the first factor or the second factor increases; apply the first set of correction parameters to the image of the image group to obtain a first enhanced image; generate a difference image between the first enhanced image and the another image from the image group; and use the difference image for detecting defect candidates. Within the system, the processor is optionally further configured to: generate a second set of correction parameters to be applied to a plurality of pixels of the another image from the image group, wherein the correction parameters in the second set are determined so as to minimize a value of a combination of: a third factor indicating variability of a third set of correction parameters consisting of a sum of the first set of the correction parameters and the second set of correction parameters, and a fourth factor indicative of a difference between the image from the image group as enhanced by the applying the first set of correction parameters and the another image in the image group as enhanced by the applying the second set of correction parameters, wherein the difference image is generated between the first enhanced image and the another image enhanced by the applying the second set of correction parameters. Within the system, the correction parameters optionally comprise shift in two dimensions, and gray level correction and gray level offset. Within the system, the first set of correction parameters are optionally determined using an optical flow method. Within the system, the first set of correction parameters are optionally determined by solving a system of linear equations. Within the system, the image is optionally obtained by combining two or more images having different perspectives.

In accordance with yet other aspects of the presently disclosed subject matter, there is provided a computer program product comprising a computer readable storage medium retaining program instructions, which program instructions when read by a processor, cause the processor to perform a method comprising: accommodating in the memory an image group comprising a reference image of the object and an image of the object; generating at least a first set of correction parameters to be applied to a plurality of pixels of an image from the image group, wherein the first set of correction parameters are determined so as to minimize a value of a combination of: a first factor indicative of variability of the first set of correction parameters, and a second factor indicative of a difference between an image from the image group as enhanced by applying the first set of correction parameters and another image in the image group, wherein the value increases as the first factor or the second factor increases; applying the first set of correction parameters to the image of the image group to obtain a first enhanced image; generating a difference image between the first enhanced image and the another image from the image group; and using the difference image for detecting defect candidates.

In accordance with yet other aspects of the presently disclosed subject matter, there is provided a method of detecting one or more defects in an object using a processor operatively connected to a memory, the method comprising: accommodating in the memory an image group comprising an image of the object and a reference image of the object; generating correction parameters to be applied to a plurality of pixels of an image from the image group, wherein the correction parameters are determined so as to minimize a value of a combination of: a first factor indicative of variability of the correction parameters, and a second factor indicative of a combination of pixel values in a difference image obtained by subtracting an image from the image group as enhanced by applying the correction parameters and another image in the image group, wherein increase of the first factor and/or the second factor increases the value; generating an optimal difference image between the first enhanced image and the another image from the image group, using the correction parameters; and using the optimal difference image for detecting defect candidates.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter can be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "representing", "comparing", "generating", "applying", "enhancing" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities.

The operations in accordance with the teachings herein can be performed by a computer specially constructed for the desired purposes or by a general-purpose computer specially configured for the desired purpose by a computer program stored in a non-transitory computer-readable storage medium.

The terms "non-transitory memory" and "non-transitory storage medium" as used herein should be expansively construed to cover any include any volatile or non-volatile computer memory suitable to the presently disclosed subject matter.

The term "registration", unless specifically stated otherwise, as used in the specification, should be expansively construed to cover any matching between images, intended to determine how one of the images should be altered to correspond to the other image, vice versa, or a combination thereof. Registration may utilize search of features appearing in one of the images within the other. Registration may be performed between an image of an actual object and a reference image. The reference image may be an image of another object, an image of a prototype known to be error free, a synthetic image of the object may be generated upon the design data while taking into account the different layers, their features and ambient colors, the impact of the ambient color and features of a layer on how subsequent layers appear, or the like.

Figure 1:
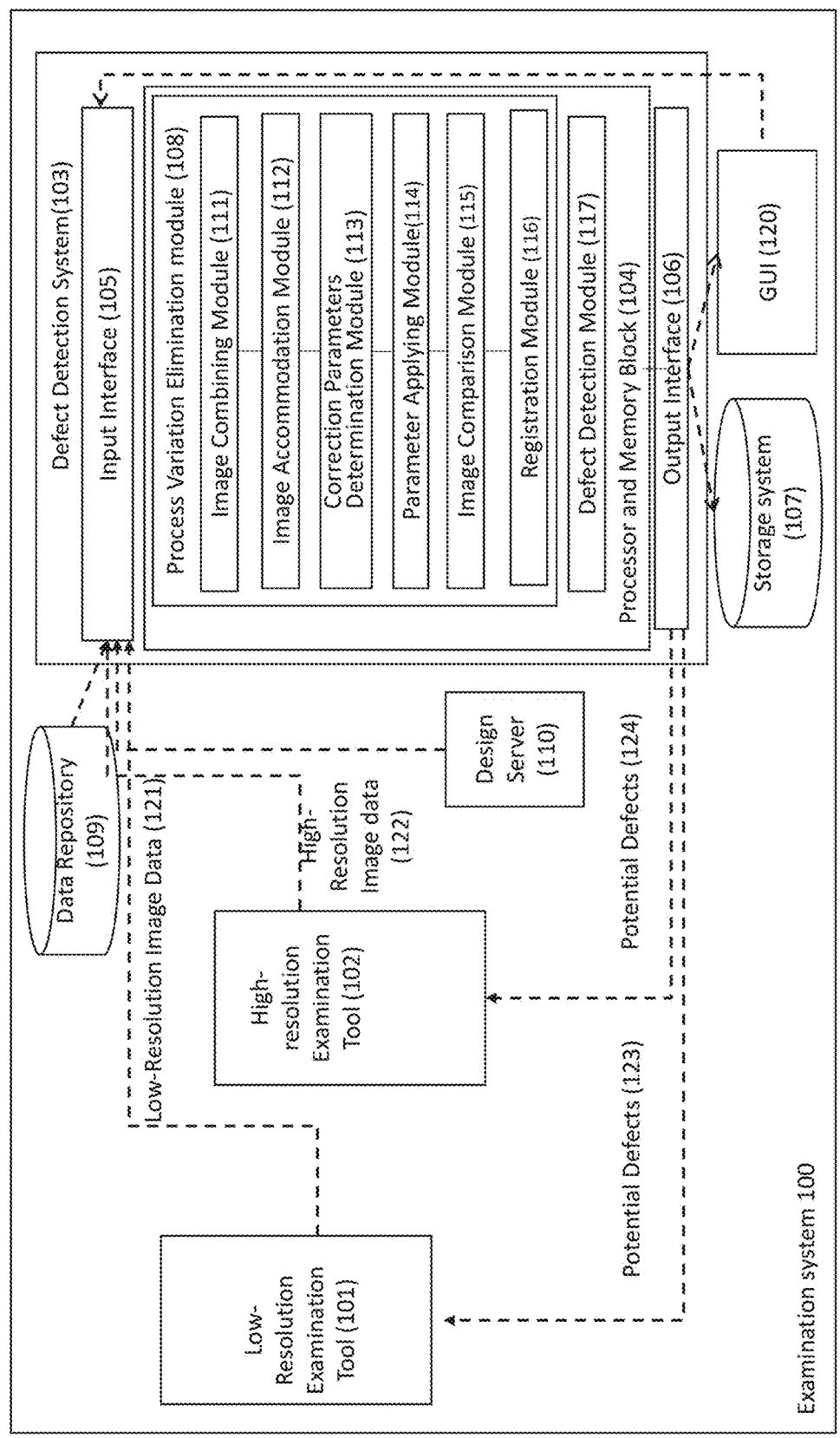
FIG. 1 illustrates a generalized functional block diagram of an examination environment, in accordance with some exemplary embodiments of the disclosure.

Reference is now made to FIG. 1, illustrating a functional block diagram of an examination system in accordance with certain embodiments of the presently disclosed subject matter. Examination system 100 illustrated in FIG. 1 can be used for examination of an object for defects. The examination can be a part of the object fabrication and can be provided during manufacturing the object or afterwards. The illustrated examination system 100 comprises computer-based system 103 capable of automatic detection of potential defects in the manufactured object. System 103 is referred to hereinafter as Defect Detection system (DDS). DDS 103 can be operatively connected to one or more low-resolution examination tools 101 and/or one or more high-resolution examination tools 102. The examination tools are configured to capture inspection images and/or to review the captured inspection image(s) and/or to enable or provide measurements or other checks or tests related to the captured image(s). DDS 103 can be further operatively connected to additional data sources such as design server 110 or data repository 109.

DDS system 103 can comprise a processor and memory block (PMB) 104 operatively connected to a hardware-based input interface 105 and to a hardware-based output interface 106. PMB 104 is configured to provide all processing necessary for operating DDS 103 and is further detailed with reference to FIGS. 2-5 below. PMB 104 comprises a processor (not shown separately) and a memory (not shown separately). The processor of PMB 104 can be configured to execute several functional modules in accordance with computer-readable instructions implemented on a non-transitory computer-readable memory comprised in PMB 104. Such functional modules are referred to hereinafter as comprised in PMB 104. The functional modules comprised in PMB 104 include or are operatively connected to a process variation elimination (PVE) module 108, for eliminating process variations between the images.

Process variations are effects caused by or during the manufacturing of an object which may affect the way the object appears and is captured, but may or may not affect its functionality. Process variations may include gray level changes which cause the gray levels of an object to be different than in a reference image, and shifts which cause one or more features to be located at other locations of the object than those expected, wherein the features may be shifted uniformly or non-uniformly over an image.

Unless specifically stated otherwise, the term "gray level corrections" used in the specification should be expansively construed to cover any gain or offset that may be applied to the gray level values of pixels in one or more images, such that they match pixels in another image, or to applying changes in the gray level of two images such that the two images become more similar or identical once the changes are applied. The gray level corrections may be uniform over the entire image, uniform across features or areas within the image, pixel-wise, or a combination thereof.

Unless specifically stated otherwise, the term "shift" used in the specification should be expansively construed to cover any offset in one or more directions that may be applied to pixels of one or more images, such that they match pixels in another image, or to applying offsets to two images such that the two images become more similar or identical once the changes are applied. The shift values may be uniform over the entire image, uniform across features or areas within the image, pixel-wise, or a combination thereof.

Unless specifically stated otherwise, the term "correction parameters" used in the specification should be expansively construed to cover corrections (e.g. gray level corrections, shifts, etc.) to be applied to one or two images such that after application at least some differences between the images are eliminated or reduced and the images are more similar to each other. Any one or more of the correction parameters may be uniform across the image, uniform across features or areas within the image, pixel-wise, or a combination thereof.

PVE module 108 may comprise image combining module 111 configured to combine two or more images captured from different perspectives, with different parameters, by different capture devices or sources, or the like; image accommodation module 112 configured to accommodate in memory two or more images, including an image of a manufactured object and a reference image; a correction parameter determination module 113 configured to determine changes to be applied to the image of the manufactured object or the reference image, the changes related to shifts or gray level corrections; a parameter applying module 114 configured to apply the determined corrections to the image of the manufactured object or the reference image; image comparison module 115 configured to compare two images, for example by subtracting one from the other; and registration module 116 configured to form a registration between the image of the manufactured object and the reference image, for example an initial registration preceding the correction parameter determination.

PMB 104 can further include defect recognition module 117 for detecting defects within the object using, for example, the image resulting from image comparison module 115. Operation of PVE module 108, PMB 104 and the functional blocks therein is further detailed with reference to FIGS. 2-5.

As will be further detailed with reference to FIGS. 2-5, DDS 103 is configured to receive, via input interface 105, images or data (and/or derivatives thereof) produced by the examination tools and/or data stored in one or more data repositories 109 and/or in design server 110 and/or another relevant data depository. DDS 103 is further configured to process the received images data and send, via output interface 106, results to a storage system 107, to examination tool(s), to a computer-based graphical user interface (GUI) 108 for rendering the results and/or to external systems. GUI 120 can be further configured to enable user-specified inputs related to operating DDS 103.

By way of non-limiting example, an object can be examined by a low-resolution examination tool 101, e.g. an inspection system such as the Elite or the UVision systems by Applied Materials, Inc., or other tools. The resulting data, referred to hereinafter as low-resolution image data 121, being informative of the low-resolution images (and/or derivatives thereof), can be transmitted, directly, or via one or more intermediate systems, to DDS 103. Alternatively or additionally, the object can be examined by a high-resolution examination tool 102 (e.g. a subset of potential defects selected for review can be reviewed by a scanning electron microscope (SEM) or Atomic Force Microscope (AFM). The resulting data, referred to hereinafter as high-resolution image data 122, informative of high-resolution images and/ or derivatives thereof, can be transmitted, directly, or via one or more intermediate systems, to DDS 103.

Upon detecting possible defects in the manufactured object, DDS 103 can send the results (e.g. potential defects 123 or 124) to any of the examination tool(s), store the results such as the imaged defects or the correction parameters in storage system 107, render an image modified in accordance with the results via GUI 120 and/or send to an external system.

Those versed in the art will readily appreciate that the teachings of the presently disclosed subject matter are not bound by the system illustrated in FIG. 1, equivalent and/or modified functionality can be consolidated or divided in another manner and can be implemented in any appropriate combination of software with firmware and hardware.

It is noted that the examination system illustrated in FIG. 1 can be implemented in a distributed computing environment, in which the aforementioned functional modules shown in FIG. 1 can be distributed over several local and/or remote devices, and can be linked through a communication network. It is further noted that in another embodiment at least part of examination tools 101 and/or 102, data repository 109, storage system 107 and/or GUI 120 can be external to the examination system 100 and operate in data communication with DDS 103 via input interface 105 and output interface 106. DDS 103 can be implemented as stand-alone computer(s) to be used in conjunction with the examination tools. Alternatively, the respective functions of DDS 103 can, at least partly, be integrated with one or more examination tools.

Without limiting the scope of the disclosure in any way, it should also be noted that the examination tools can be implemented as inspection machines of various types, such as optical imaging machines, electron beam inspection machines and so on. In some cases the examination tools can be configured to examine an entire object (e.g. an entire wafer or at least an entire die) for detection of potential defects. In other cases, at least one examination tool can be a review tool, which is typically of higher resolution and which is used for ascertaining whether a potential defect is indeed a defect. Such a review tool is usually configured to inspect fragments of a die, one at a time, in higher resolution.

Figure 2:
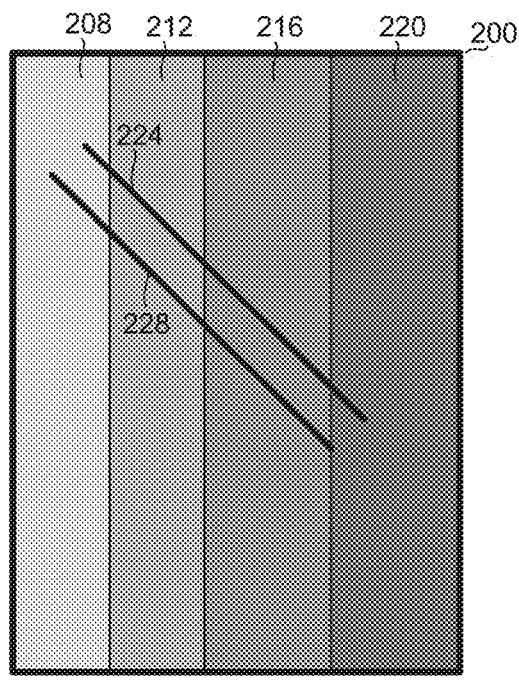
FIG. 2 illustrates an example of the problem of detecting defects in an object in the presence of process variations.
Figure 2:
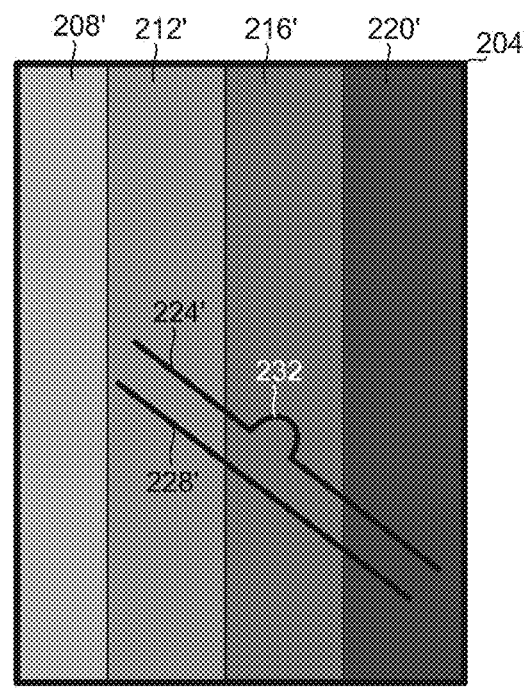

Reference is now made to FIG. 2, providing an illustrative example of the problem of detecting defects in an object in the presence of process variations.

FIG. 2 shows reference image 200 depicting a reference object. It is assumed that reference image 200 represents a functional object containing no defects, and that other objects of the same specimen should conform to the reference object. For every such manufactured object it may be required to detect defects, for example by determining differences between an image capturing the object and reference image 200.

It will be appreciated that image 200 may represent a part of an object, depending on the object size, the resolution of the features of the object, capture device resolution, or other factors and not necessarily a full object. For example, image 200 may comprise a die of a wafer, or a part thereof. It will also be appreciated that reference image 200 may be a captured image of an actual reference object, or a synthetic image created, based on design data of the object.

Image 200 comprises areas 208, 212, 216 and 220 having varying shades, which may be due to different materials or processes used at each area, due to chemical, mechanical or electrical variations, or due to any other reason. Image 200 further comprises two lines 224 and 228, representing features in the reference object, which are required to be in any object of the specimen.

Image 204 is an illustration of a capturing of a fabricated object, which may be taken as part of the object inspection or review during fabrication, and in which it is required to detect defects. Captured image 204 also shows varying shades in areas 208', 212', 216' and 220'. Captured image 204 also shows lines 224' and 228'.

It is seen that there are gray level differences between reference image 200 and captured image 204, such that each area in image 204 is darker than the corresponding area in reference image 200. Thus, the shade of area 208' is darker than the shade of area 208, and similarly for area pairs 212-212', 216-216' and 220-220'.

It can be further seen that lines 224' and 228' are shifted or deformed relative to lines 224 and 228, and that line 224' comprises a protrusion 232 which represents a defect.

The gray level changes between reference image 200 and captured image 204, and the shift or deformation of lines 224' and 228 may be insignificant, as they may stem from optical differences in acquiring any one or both images (or an inaccurate synthetic generation of reference image 200), field of view offset, noise, or insignificant process variations during manufacturing.

Protrusion 232, on the other hand, may be important as it may indicate a true defect causing dysfunctionality and is required to be detected. Optimally, in the absence of process variations, acquisition differences and inaccurate synthetic image generation, comparison may be performed by subtracting image 200 from image 204, or vice versa, which may nullify most pixels, such that only the pixels having values other than zero, which may indicate defects, need to be considered.

However, the shift or deformation and the gray level differences between the images introduce significant differences which may not be removed by traditional registration. In other cases, registration of the two images may be ineffective as applying the changes to one image (or applying some changes to a first image and other changes to a second one) still results in highly different images, between which it is difficult to locate the differences.

Thus, it may be required to determine correction between images that compensates for differences stemming from process variations or similar causes, while maintaining the differences caused by defects or image defects that need to be detected.

Figure 3:
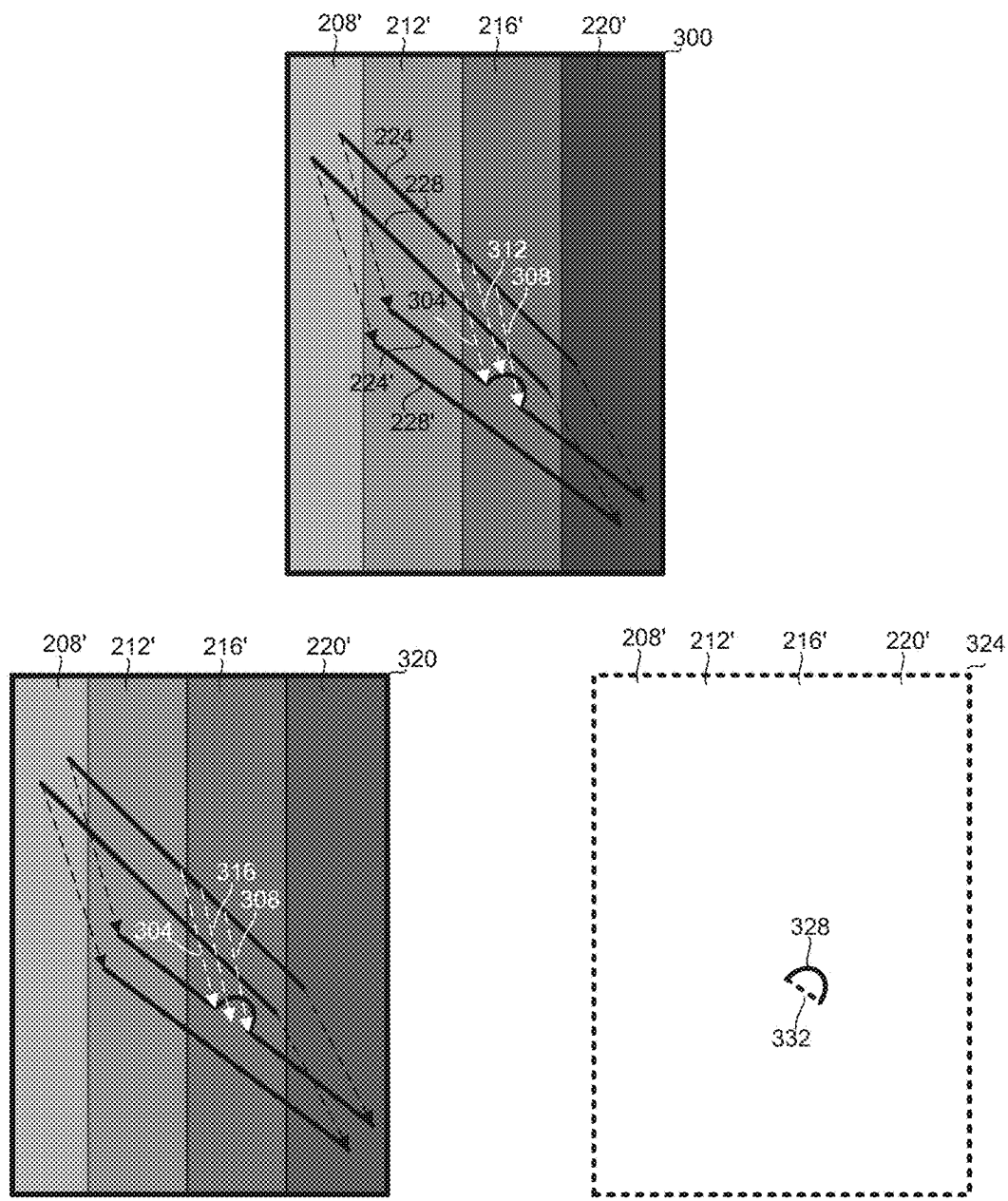
FIG. 3 illustrates an example of correcting changes caused by process variations between a reference image and a captured image, in accordance with some exemplary embodiments of the disclosure.

Reference is now made to FIG. 3, illustrating an example of correcting changes caused by process variations between a reference image and a captured image, in accordance with some exemplary embodiments of the disclosure.

Image 300 shows image 200 having undergone gray level change, which makes the gray levels darker, such that the shades of image 300 are substantially equal to those of captured image 204. Image 300 also shows vectors 304, 308, and 312 which are some of the vectors transforming lines 224 and 228 into lines 224' and 228', including transforming protrusion 232. It will be appreciated that feature-wise, area-wise or pixel-wise correction may be required for transforming each pixel in image 200 into a corresponding pixel in image 300.

However, if the gray level correction and the vector corrections are determined such that each pixel is matched to the most appropriate pixel, as shown in image 300, the image obtained by applying the corrections may be substantially identical to image 204, and thus is ineffective for detecting differences between the images, where differences may indicate defects.

Therefore, it is required to correct the gray level changes, and the shift and deformations, but in a manner that will preserve defects while correcting process variation effects, as shown in illustration 320. Thus, if the gray levels are changed such that the obtained shades are substantially like those of image 204, and vectors 304 and 308 are as in illustration 300, but vector 316 is closer in size and direction to vectors 304 and 308 than vector 312, then the differences between image 300 having undergone the corrections and image 204 are as shown in image 324, which shows only the differences, comprising defect 328, as opposed to corresponding feature 332. In such an image the differences may be detected, thus saving significant resources which are not wasted on filtering false defects caused by process variations.

It will be appreciated that while the description above relates to shift and deformation, additionally or alternatively a similar situation may occur for gray level variations.

In accordance with some embodiments, registration between a reference image and a captured image may be performed by defining a penalty function for the deformation corrections and the gray level corrections. The penalty function may take into account the differences between the reference image to which the corrections are applied and the captured image (or equivalent differences between the reference image and the captured image to which the inverse differences are applied, or yet equivalent differences between the reference image to which some corrections are applied and the captured image to which other corrections are applied).

However, the penalty function may also take into account the variations of the corrections, such that a correction that is significantly different from its neighboring corrections incurs high penalty. Thus, smooth changes may carry a smaller penalty than abrupt changes.

In the example of FIG. 3, vector 312 is substantially different from its neighboring vectors 304 and 308, and may thus incur high penalty on this transformation. Vector 316, on the other hand, which is more similar to vectors 304 and 308, does not incur this penalty. However, the transformation between image 200 and image 204 which includes vector 312, unlike the transformation comprising vector 316, perfectly transforms image 200 into image 204, thus disabling defect detection. Therefore, the penalty function has to balance between these two ends. Finding the transformations that optimize, for example minimize, the penalty function, may provide for corrections that conceal process variations while maintaining defects.

Figure 4:
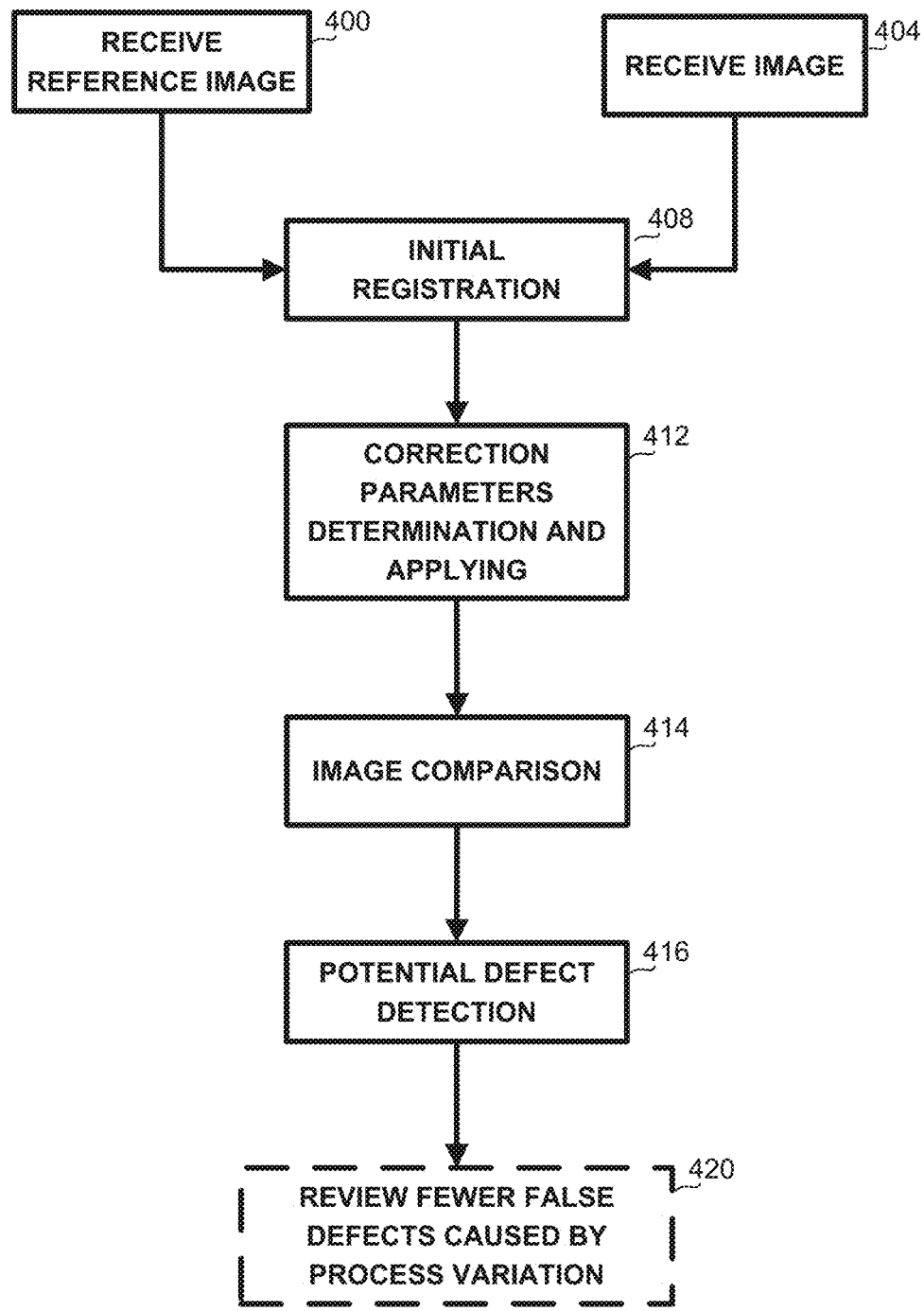
FIG. 4 illustrates a generalized flowchart for object examination, in accordance with some exemplary embodiments of the disclosure.

Reference is now made to FIG. 4, showing a generalized flow chart of a method for detecting defects, in which process variations correction in accordance with the disclosure may be used.

Input interface 105 can receive (400) a reference image of the object to be examined and may accommodate the reference image in memory 104. The image may be received from a storage device, over a communication channel, from another computing platform after being processed, synthetically generated upon design data of the object, or in any other manner.

Input interface 105 can receive (404) an image of the object, and may accommodate the image in memory 104. The image may be received from an acquisition device such as capture device 140 or capture device 144 of FIG. 1, an acquisition member associated with the device detecting the defects, from another computing platform after being processed, from a storage device, over a communication channel, or in any other manner.

Registration module (116) can perform initial registration (408) between the captured image and the reference image.

The initial registration may be a rigid registration in which a same offset is applied to any of the images in order to match to another image. However, the initial registration may not be sufficient for detecting defects, performing measurements or other tasks, but merely for adjusting the images such that further registration may be more effective. Initial registration (408) may be used, for example for locating one instance of a repetitive pattern in one or more of the images.

Correction parameters determination module 113 may determine, and parameters applying module 114 may apply (412) the correction parameters to the image and/or to the reference image. The correction parameters can include shift in one or two dimensions, and gray level correction, which may include gain and offset. The correction parameters can be calculated for matching the reference image and the captured image, as registered during the initial registration stage (408). The deformation and gray level corrections may be pixel-wise, such that each pixel may be transformed differently from other pixels, and the corrections may take into account not only the similarity between the images after the corrections are applied, but also the correction variabilities, thus significantly reducing differences caused by process variations. It will be appreciated that determining a gray level gain and offset, rather than a discrete per-pixel gray level correction may provide for introducing a smoothness constraint on the transformation. Determining the correction parameters is further detailed in association with FIG. 4 below.

Image comparison module 115 can compare the images (414) wherein at least one thereof has been enhanced, to obtain a difference image. Thus, in some embodiments, comparison may take place between the first image as enhanced by applying a set of correction parameters, and the reference image, while in other embodiments, comparison may take place between the first image as enhanced by applying a first set of correction parameters, and the reference image as enhanced by applying a second set of correction parameters. Comparison may be implemented, for example, by subtracting between the image of the object or the reference image to which correction parameters have been applied, and the reference image or the image of the object, respectively, to which changes may or may have not been applied.

Defect detection module 117 can detect potential defects (416) utilizing the difference image, obtained for example by subtracting, between the image of the object or the reference image to which correction parameters have been applied, and the reference image or the image of the object, respectively, to which changes may or may have not been applied. It will be appreciated that depending on the implementation, the initial registration or the corrections may be applied to the reference image, to the acquired image, or to both.

Defect detection module 117 can detect (416) the potential defects such that they may be reviewed or otherwise examined. It will be appreciated that the corrections are determined and applied prior to detecting defects in a difference image, rather than generating a difference image and searching for defects therein. For example, in some prior art systems, potential defects are detected without correction parameters, resulting in a plethora of potential defects, many of which are false alarms caused by process variations. Applying correction parameters prior to defect detection can significantly reduce the number of potential defects to be reviewed (420), since many false defects caused by process variations are eliminated, thus making the defect detection process faster and more efficient. By eliminating many false defects, more time and resources can be used for examining the other defects, thus increasing the detection rate.

Figure 5:
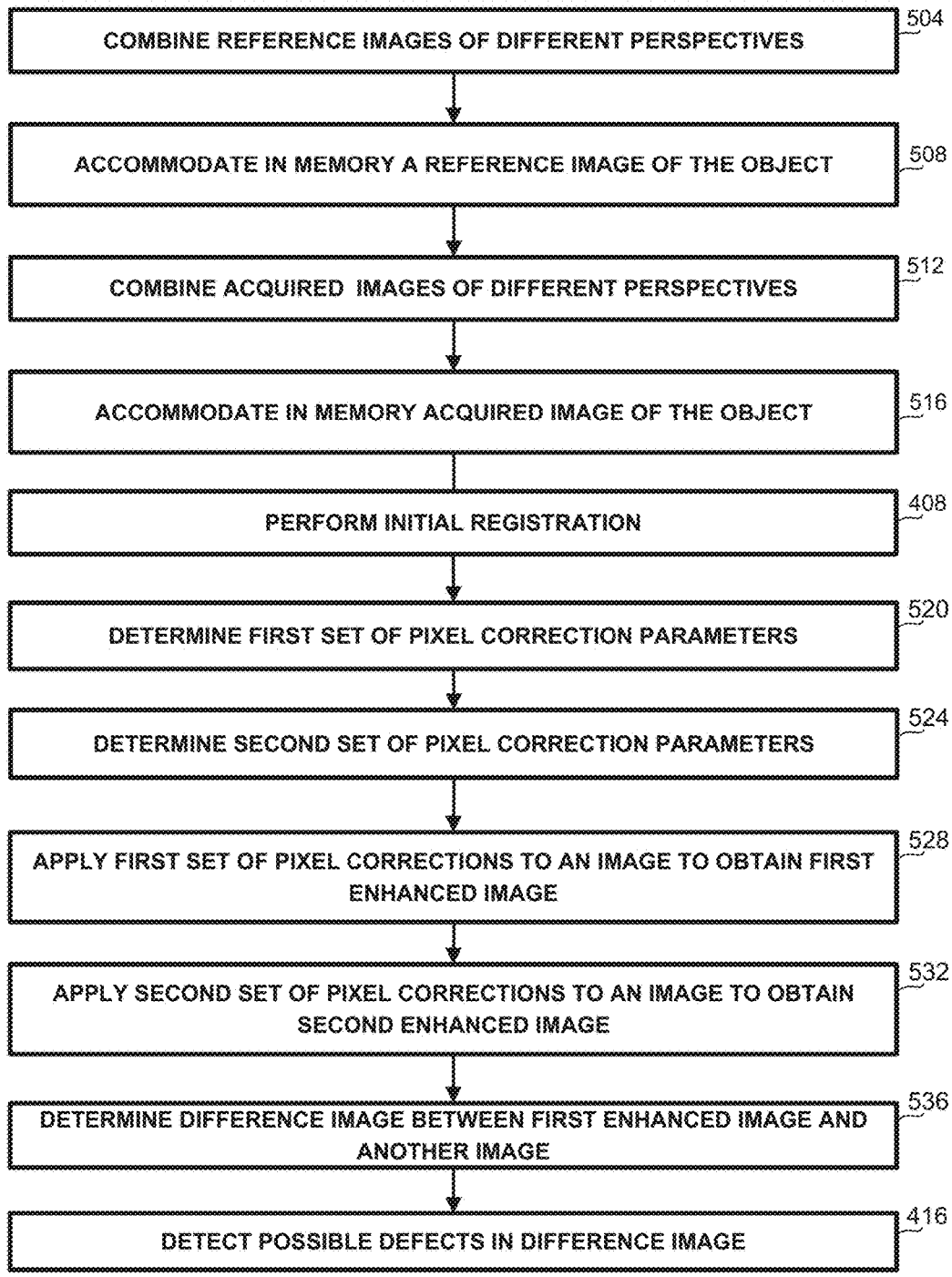
FIG. 5 illustrates a generalized flowchart for detecting potential defects using process variations correction, in accordance with some exemplary embodiments of the disclosure.

Reference is now made to FIG. 5, showing a generalized flowchart of detecting defects using elimination of process variations, in accordance with some exemplary embodiments of the disclosure.

Image combining module 111 may combine (504) two or more reference images, wherein the reference images can be taken for example from different perspectives, have different characteristics, or otherwise demonstrate different aspects of the reference. Alternatively, an acquired image of a reference object may be combined with design data of the object, two images generated from the design data may be combined, or the like.

Image accommodation module 112 can accommodate (508) in memory 104 the combined reference image, or an original reference image if no reference image combination is required.

Image combining module 111 may combine (512) two or more acquired images, for example two acquired images taken for example from different perspectives, having different characteristics, or otherwise demonstrate different aspects of the reference image.

Image accommodation module 112 can accommodate (516) in memory 104 the combined acquired image, or an original acquired image if no acquired image combination is required.

As detailed in association with FIG. 4 above, registration module 116 may perform initial registration (408) between the combined reference image and the combined acquired image.

Correction parameters determination module 113 can determine (520) a first set of correction parameters to be applied to the image, or determine (524) a second set of correction parameters to be applied to the reference image. Applying either set of correction parameters to the associated image can transform them to be more similar to each other. It will be appreciated that determining one or two such sets can be interchangeable. For example, shifting the pixels of the reference image by 5 pixels to the right is equivalent to shifting the pixels of the reference image by 7 pixels to the right and shifting the pixels of the acquired image by 2 pixels to the right. Thus, determining the first set (520) and determining the second set (524) can be performed separately, concurrently, or as one step.

The correction parameters may comprise four parameters: shift in the X direction, shift in the Y direction, gray level gain and gray level offset. The gray level offset is required, since a gray level of zero cannot be corrected into a positive gray level value using gain alone. The four parameters are to be determined per pixel in the image, since process variations such as gray level changes, deformation or others may be non-uniform and non-linear over the images.

The pixel corrections may be determined so as to minimize an energy function, also referred to as a penalty function, wherein the energy function combines one or more components related to the difference between the images after the corrections are applied, i.e., to which extent these corrections indeed make the images similar to each other, and one or more components related to the variability of the changes, also referred to as regularization factor, i.e., to which extent the corrections are uniform, or change smoothly over the image. The difference between the images can be evaluated, for example as a combination of the values of the pixels in a difference image obtained by subtracting the two images. The combination of the values of the pixels can be determined as sum, square sum, or the like Since it may be assumed that process level variations generally do not cause abrupt changes over small areas, but behave rather smoothly, smoothness may be a factor in determining the required corrections. Without the regularization factor, minimizing the energy function would consist of selecting pixel corrections that would attempt to transform one image into the other (or transform the two images into a third image), which will eliminate many of the true defects. The two components of the energy function may be combined linearly with equal or different weights, as a square root of the two components squared, or in any other manner, such as square root of, and the energy function should increase as the variability increases, or the similarity between the images decreases.

It will be appreciated that if correction parameters are applied to the two images, the penalty function should relate to the variability of the combination of the two sets of correction parameters, such as a sum or the difference of the two sets of correction parameters, depending on the specific implementation. The similarity should relate to the difference between the two images to which the respective correction parameter sets have been applied.

In some embodiments, the energy function may implement a summation or another integration of the difference component over the entire image, and a summation or another integration of the regularization factor over the entire image, or a summation over the entire image of a combination thereof.

It will be appreciated that the four parameters, i.e., deformation in the X and Y directions, and gray level gain and offset to be calculated per pixel are interdependent, such that changing some of them may cause changes in others. Therefore, the parameters may be determined using a combined calculation, and not separately.

The energy function used, and the method for calculating the registration values of gray level corrections that optimize it, may be selected in accordance with the technique appropriate for the specific application and imaging equipment used.

Some exemplary techniques include the following:

Optical flow, for example the Lucas-Kanade technique. Optical flow assumes small movements of about 1 pixel between the images, and consistent gray level. This method combines global and local computations for determining the variables. The data term in this method may be robust, i.e. not influenced by gray level variations, similar to cross correlation methods.

Markov Random Fields (MRF) or Markov Conditional Random Fields (CRF): these techniques use a graph based probabilistic method, and compute a map for determining the estimated variables. The methods employ a square difference energy term and are suitable also for large movements.

It will be appreciated that the methods above are relevant for determining movement, but can be also applied for incorporating also gray level changes.

Once the energy function is determined, a set of values can be determined for each pixel, including shifts in the X and Y directions, gain and offset, which optimizes, for example minimizes, the energy function.

For solving the optical flow methods, a solver may be used, such as a Lucas-Kanade solver, while MRF or CRF may be solved using multi label graph cuts.

It will be appreciated that the provided solutions are not limited to integer numbers, and sub-pixel or sub-gray level values expressed as real numbers may also be obtained from one or more of the solvers.

It will be appreciated that further algorithms implying other formulations of the energy function and corresponding solvers may also be applied. Each such method has pros and cons, such that one method may be more appropriate for some applications and another method may be more appropriate for other applications.

It will be appreciated that the deformation and the gray level changes are not orthogonal to each other, as changing the shift of pixels in the reference image or the acquired image may also change the gray level differences. It will also be noted that the deformation and gray level corrections for different pixels are not orthogonal, as moving pixels may change the required gray level corrections, and vice versa.

As mentioned above, the pixel level corrections may be applied to the reference image to make it similar to the acquired image, to the acquired image to make it similar to the reference image, or a combination thereof.

Parameter applying module 114 can then apply (528) the first set of correction parameters to the image to obtain a first enhanced image, and can apply (532) the second set of correction parameters to the reference image, to obtain a second enhanced image.

Image comparison module 115 can compare (536) the first enhanced image and the second enhanced image, to obtain a difference image. The difference image may be obtained, for example, by subtracting the first enhanced image from the second enhanced image, or vice versa. It will be appreciated that if only one correction parameter set is applied, the difference image will be determined between the image as enhanced and the reference image, or between the reference image as enhanced and the image.

Detect detection module 117 may then detect potential defects (416) within the difference image. Ideally, the only non-zero pixels in the difference image are those related to the defects. However, in real life situations, other non-zero pixels may exist. Still, after having enhanced the images to correct the effects of process variation, the pixels associated with defects may be differentiated by image processing algorithms, such as line detection, edge detection or others.

In some embodiments, determining pixel level corrections for eliminating process variations may also be used in conjunction with other methods. For example, if potential defects are detected prior to determining pixel level corrections, the corrections may be determined per defect or per area, and be followed by pre-detection of the defects, which may eliminate many such potential defects which are actually false alarms.

In other applications, particularly when large images are to be compared, the image may be split into a number of areas, and pixel level corrections may be determined and applied separately for each such area, which may obtain more exact results.

In some applications, determining the pixel level corrections may be performed hierarchically. For example, a Gaussian pyramid may be constructed for the reference image (or an image combined from multiple reference images taken from multiple perspectives), and a corresponding Gaussian pyramid may be constructed for the acquired image (or an image combined from multiple acquired images taken from multiple perspectives). The pixel level corrections may be determined and applied to each layer in the Gaussian pyramid, starting at the smallest level and proceeding through the larger (or lower) layers.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

What is claimed is:

1. A method of detecting one or more defects in an object using a processor operatively connected to a memory, the method comprising:
   accommodating in the memory an image group comprising a reference image of the object and an image of the object;
   generating at least a first set of correction parameters to be applied to a plurality of pixels of an image from the image group,
   wherein the first set of correction parameters are determined so as to minimize a value of a combination of: a first factor indicative of variability of the first set of correction parameters, and a second factor indicative of a difference between the image from the image group as enhanced by applying the first set of correction parameters and another image in the image group, wherein the value increases as the first factor and/or the second factor increases, and wherein the first factor indicative of variability of the first set of correction parameters refers to a variation between a correction parameter from the first set of correction parameters and a neighboring correction parameter from the first set of correction parameters;
   applying the first set of correction parameters to the image of the image group to obtain a first enhanced image;
   generating an optimal difference image between the first enhanced image and the another image from the image group; and
   using the optimal difference image for detecting defect candidates.

2. The method of claim 1, further comprising:
   generating a second set of correction parameters to be applied to a plurality of pixels of the another image from the image group, wherein the correction parameters in the second set are determined so as to minimize a value of a combination of: a third factor indicating variability of a third set of correction parameters consisting of a sum of the first set of correction parameters and the second set of correction parameters, and a fourth factor indicative of a difference between the image from the image group as enhanced by the applying the first set of correction parameters and the another image in the image group as enhanced by the applying the second set of correction parameters,
   wherein the optimal difference image is generated between the first enhanced image and the another image enhanced by the applying the second set of correction parameters.

3. The method of claim 1, wherein the correction parameters comprise shift in two dimensions.

4. The method of claim 1, wherein the correction parameters comprise gray level correction and gray level offset.

5. The method of claim 1, wherein the first set of correction parameters are determined using an optical flow method.

6. The method of claim 1, wherein the first set of correction parameters are determined using a Markov Random Fields method.

7. The method of claim 1, wherein the first set of correction parameters are determined by solving a system of linear equations.

8. The method of claim 7, wherein the system of linear equations comprises 4 * N * M linear equations, wherein N and M are sizes in pixels of edges of the reference image.

9. The method of claim 1, wherein the image is obtained by combining at least two images having different perspectives.

10. The method of claim 1, wherein the reference image is obtained by combining at least two reference images having different perspectives.

11. The method of claim 1, further comprising:
    generating a first Gaussian pyramid for the reference image;
    generating a second Gaussian pyramid for the image; and
    performing said accommodating the reference image, said accommodating the image and said generating, for each pair of corresponding layers of the first Gaussian pyramid and the second Gaussian pyramid.

12. The method of claim 1, wherein any correction parameter of the first set of correction parameters is a real number representing a sub-pixel shift or a sub gray-level correction or offset.

13. A method of detecting one or more defects in an object using a processor operatively connected to a memory, the method comprising:

accommodating in the memory an image group comprising a reference image of the object and an image of the object;

generating at least a first set of correction parameters to be applied to a plurality of pixels of a first image from the image group, and a second set of correction parameters to be applied to a plurality of pixels of a second image from the image group, wherein the first set of correction parameters and the second set of correction parameters are determined so as to minimize a value of a combination of: a first factor indicative of variability of a third set of correction parameters consisting of a sum of the first set of the correction parameters and the second set of correction parameters, and a second factor indicative of a difference between the first image from the image group as enhanced by applying the first set of correction parameters and the second image from the image group as enhanced by applying the second set of correction parameters, wherein the value increases as the first factor and/or the second factor increases, and wherein the first factor indicative of variability of the third set of correction parameters consisting of a sum of the first set of correction parameters and the second set of correction parameters refers to a variation between (a) and (b), wherein (a) and (b) are:
(a) a sum of a correction parameter from the first set of correction parameters as applied to a pixel and a correction parameter from the second set of correction parameters as applied to the pixel, and
(b) a sum of a neighboring correction parameter from the first set of correction parameters as applied to a neighboring pixel and a neighboring correction parameter from the second set of correction parameters as applied to the neighboring pixel;

applying the first set of correction parameters to the first image of the image group to obtain a first enhanced image;

applying the second set of correction parameters to the second image of the image group to obtain a second enhanced image;

generating an optimal difference image between the first enhanced image and the second enhanced image and using the optimal difference image for detecting defect candidates.

14. A computerized system for examining a wafer, the system comprising a processor configured to:
accommodate in the memory an image group comprising a reference image of the object and an image of the object;
generate at least a first set of correction parameters to be applied to a plurality of pixels of an image from the image group,
wherein the first set of correction parameters are determined so as to minimize a value of a combination of: a first factor indicative of variability of the first set of correction parameters, and a second factor indicative of a difference between an image from the image group as enhanced by applying the first set of correction parameters and another image in the image group, wherein the value increases as the first factor and/or the second factor increases, and wherein the first factor indicative of variability of the first set of correction parameters refers to a variation between a correction parameter from the first set of correction parameters and a neighboring correction parameter from the first set of correction parameters;

apply the first set of correction parameters to the image of the image group to obtain a first enhanced image;

generate an optimal difference image between the first enhanced image and the another image from the image group; and use the optimal difference image for detecting defect candidates.

15. The computerized system of claim 14, wherein the processor is further configured to:
generate a second set of correction parameters to be applied to a plurality of pixels of the another image from the image group, wherein the correction parameters in the second set are determined so as to minimize a value of a combination of: a third factor indicative of variability of a third set of correction parameters consisting of a sum of the first set of correction parameters and the second set of correction parameters, and a fourth factor indicative of a difference between the image from the image group as enhanced by the applying the first set of correction parameters and the another image in the image group as enhanced by the applying the second set of correction parameters,
wherein the optimal difference image is generated between the first enhanced image and the another image enhanced by the applying the second set of correction parameters.

16. The computerized system of claim 14, wherein the correction parameters comprise shift in two dimensions, and gray level correction and gray level offset.

17. The computerized system of claim 14, wherein the first set of correction parameters are determined using an optical flow method.

18. The computerized system of claim 14, wherein the first set of correction parameters are determined by solving a system of linear equations.

19. The computerized system of claim 14, wherein the image is obtained by combining at least two images having different perspectives.

20. A non-transitory computer readable medium comprising a computer readable storage medium retaining program instructions, which program instructions when read by a processor cause the processor to perform a method comprising:
accommodating in the memory an image group comprising a reference image of the object and an image of the object;
generating at least a first set of correction parameters to be applied to a plurality of pixels of an image from the image group, wherein the first set of correction parameters are determined so as to minimize a value of a combination of: a first factor indicative of variability of the first set of correction parameters, and a second factor indicative of a difference between an image from the image group as enhanced by applying the first set of correction parameters and another image in the image group, wherein the value increases as the first factor and/or the second factor increases, and wherein the first factor indicative of variability of the first set of correction parameters refers to a variation between a correction parameter from the first set of correction parameters and a neighboring correction parameter from the first set of correction parameters;
applying the first set of correction parameters to the image of the image group to obtain a first enhanced image;
generating an optimal difference image between the first enhanced image and the another image from the image group; and using the optimal difference image for detecting defect candidates.

21. A method of detecting one or more defects in an object using a processor operatively connected to a memory, the method comprising:
  accommodating in the memory an image group comprising an image of the object and a reference image of the object;
  generating correction parameters to be applied to a plurality of pixels of an image from the image group, wherein the correction parameters are determined so as to minimize a value of a combination of:
    a first factor indicative of variability of the correction parameters, and
    a second factor indicative of a combination of pixel values in a difference image obtained by subtracting an image from the image group as enhanced by applying the correction parameters and another image in the image group,
    wherein increase of the first factor and/or the second factor increases the value, and
    wherein the first factor indicative of variability of the correction parameters refers to a variation between a correction parameter from the correction parameters and a neighboring correction parameter from the correction parameters;
  generating an optimal difference image; and
  using the optimal difference image for detecting defect candidates.

22. A method of detecting one or more defects in an object using a processor operatively connected to a memory, the method comprising:
  accommodating in the memory an image group comprising an image of the object and a reference image of the object;
  determining correction parameters to be applied to a plurality of pixels of the image from the image group, the correction parameters aimed at minimizing a combination of:
    variability of the correction parameters, and
    difference between the image from the image group as enhanced by applying the correction parameters and the reference image in the image group,
    wherein the variability of the correction parameters refers to a variation between a correction parameter as applied to a pixel in the image and a neighboring correction parameter as applied to a neighboring pixel in the image;
  applying the correction parameters to the image of the image group to obtain a first enhanced image;
  generating an optimal difference image between the first enhanced image and the reference image from the image group; and
  using the optimal difference image for detecting defect candidates.

* * * * *

UNITED STATES PATENT AND TRADEMARK OFFICE
CERTIFICATE OF CORRECTION

PATENT NO. : 10,430,938 B2  
APPLICATION NO. : 15/655796  
DATED : October 1, 2019  
INVENTOR(S) : Amit Batikoff and Doron Portnoy Page 1 of 1

It is certified that error appears in the above-identified patent and that said Letters Patent is hereby corrected as shown below:

In the Specification

In Column 14, Line 32, replace "Detect detection module 117 may then detect potential" with --Defect detection module 117 may then detect potential--

Signed and Sealed this
Nineteenth Day of November, 2019

Andrei Iancu
*Director of the United States Patent and Trademark Office*